Sept. 20, 1932.    M. M. BORDEN    1,878,460
DOUBLE INDICATING DOUBLE RECORDING GAUGE
Filed Feb. 14, 1931    3 Sheets-Sheet 1

Inventor:—
Moro M. Borden
by his Attorneys
Howson & Howson

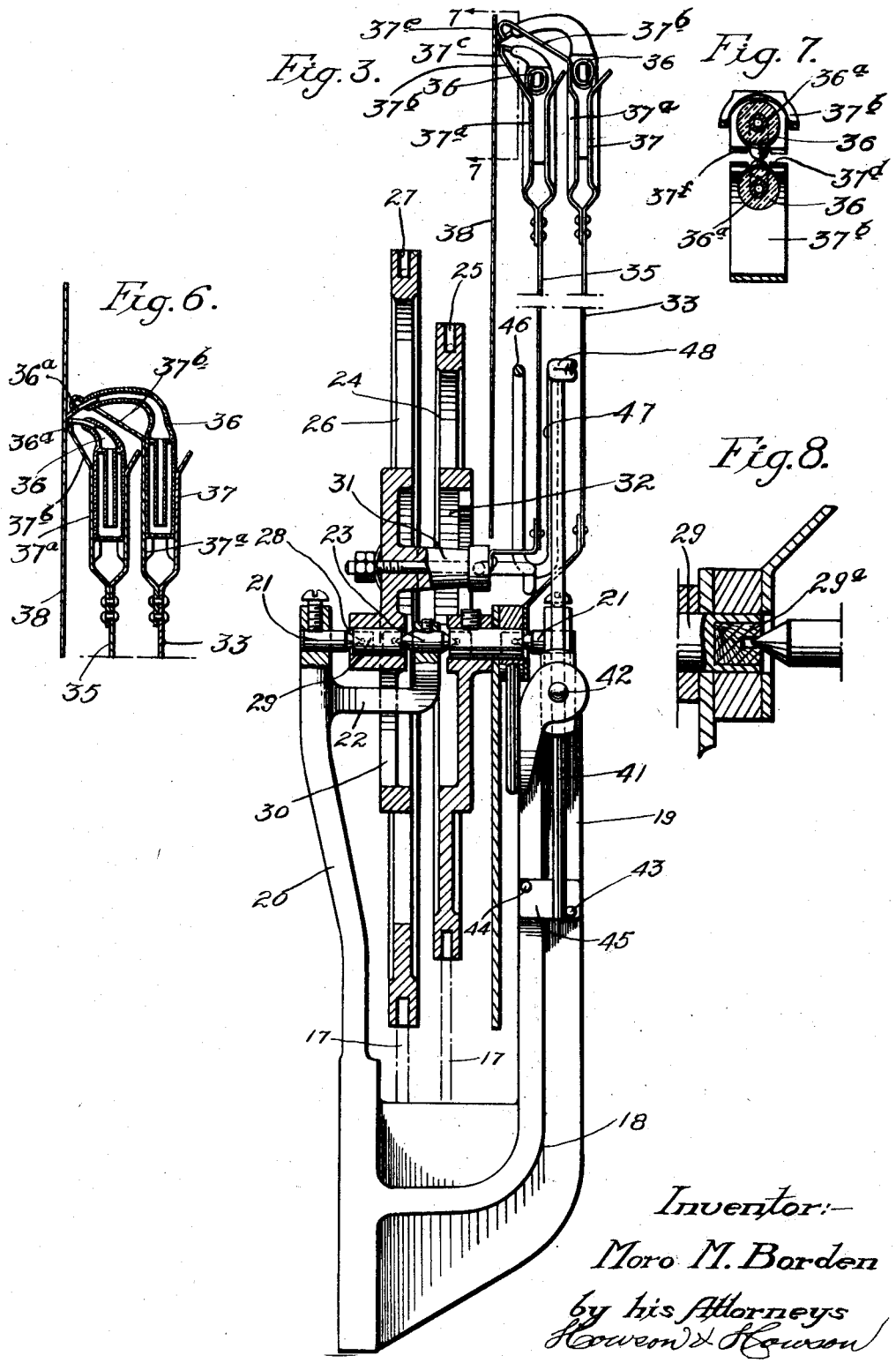

Sept. 20, 1932.  M. M. BORDEN  1,878,460
DOUBLE INDICATING DOUBLE RECORDING GAUGE
Filed Feb. 14, 1931  3 Sheets-Sheet 3
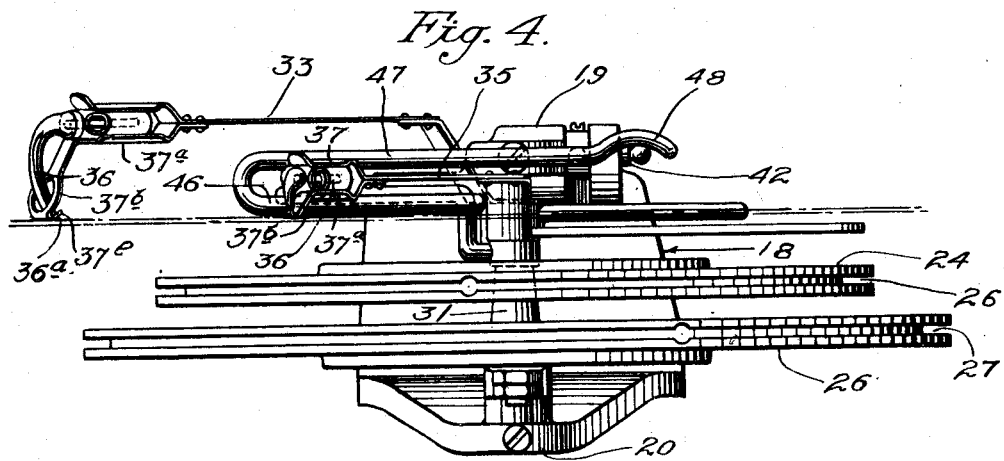
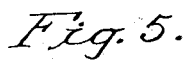
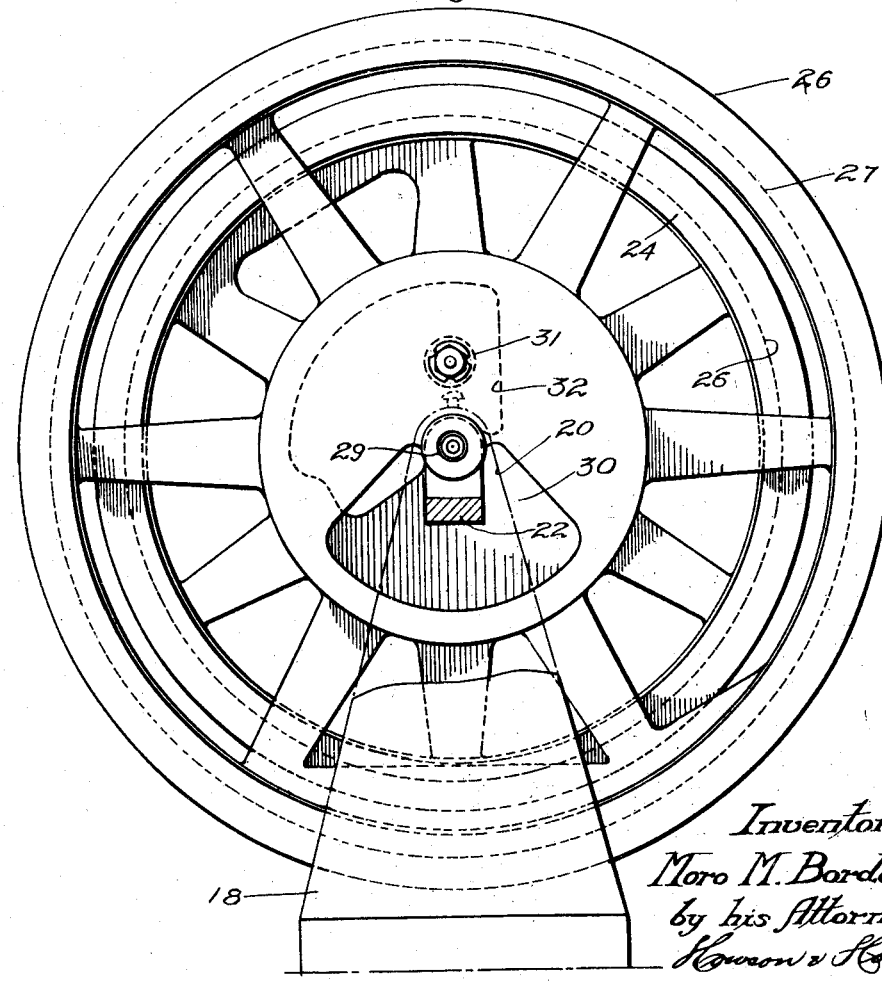

Patented Sept. 20, 1932

1,878,460

UNITED STATES PATENT OFFICE

MORO M. BORDEN, OF PHILADELPHIA, PENNSYLVANIA, ASSIGNOR TO SIMPLEX VALVE AND METER COMPANY, OF PHILADELPHIA, PENNSYLVANIA, A CORPORATION OF DELAWARE

DOUBLE-INDICATING DOUBLE-RECORDING GAUGE

Application filed February 14, 1931. Serial No. 515,859.

This invention relates to a multiple indicating and recording gauge, and more particularly to that class of gauges where, in addition to indicating a plurality of meter readings, these meter readings are recorded upon a single dial.

An important object of the invention is the provision of a construction permitting the operation of two or more pens co-acting with a single record sheet from coaxial shafts without providing a structure requiring any great casing depth.

A further object of the invention is the provision of a device of this character which may be readily and cheaply manufactured, which will be durable and efficient in service and a general improvement in the art.

These and other objects I attain by the construction shown in the accompanying drawings wherein, for the purpose of illustration, I have shown a preferred embodiment of my invention and wherein.

Fig. 3 is an enlarged vertical sectional view through the recording pen-operating mechanism of the gauge;

Fig. 4 is a plan view thereof;

Fig. 5 is a rear elevation, a portion of one of the supporting arms being broken away;

Fig. 6 is a detail sectional view through the penholder and pens;

Fig. 7 is an enlarged section on line 7—7 of Fig. 3; and

Fig. 8 is a detail view partially in section of one of the stub shafts showing the use of oilless bearings mounted therein.

Figure 1:
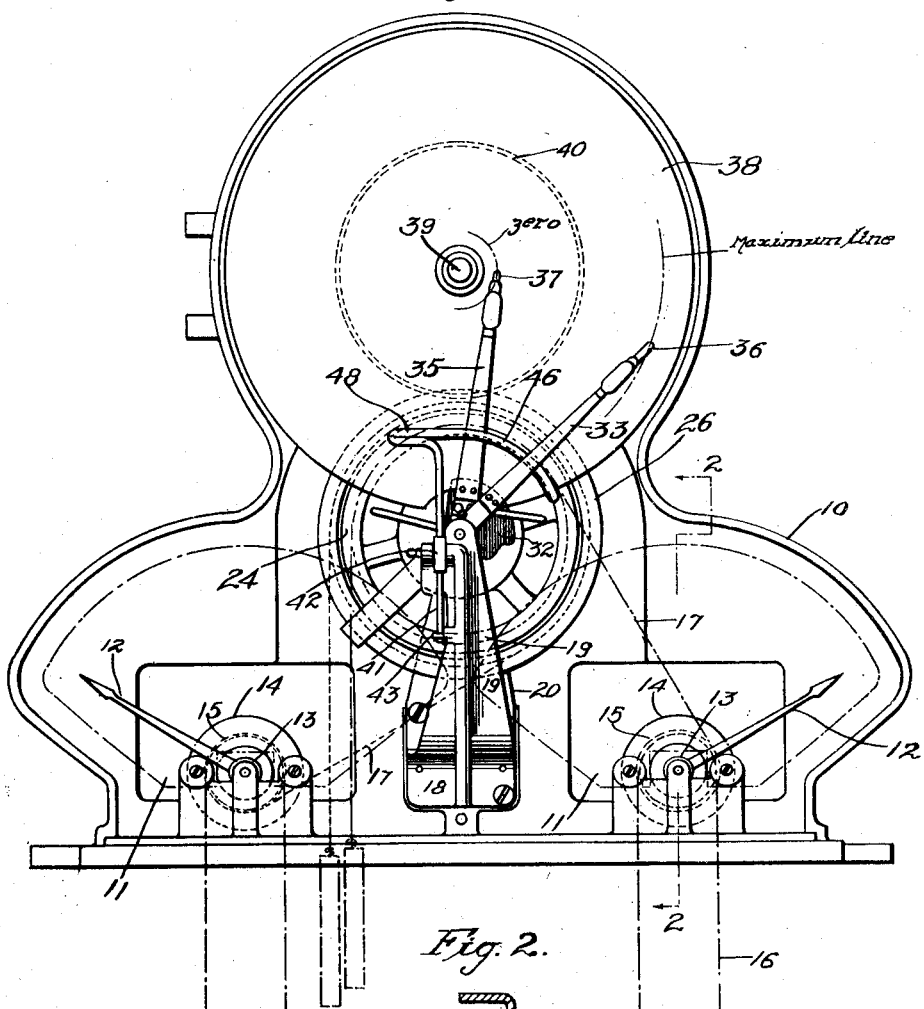
Fig. 1 is a front elevation of a double-indicating double-recording gauge constructed in accordance with my invention, the front plate being removed.
Figure 2:
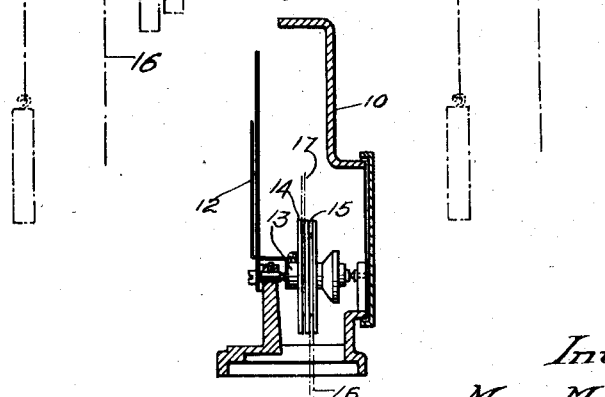
Fig. 2 is a section on line 2—2 of Fig. 1.

Referring now more particularly to the drawings, the numeral 10 generally designates a meter casing which may be of any suitable character, having disposed therein a pair of indicators 11. Each indicator 11 includes an oscillatory pointer 12 co-acting with a suitable dial, the pointer 12 being secured to the hub 13 of a pulley 14 mounted for rotation within the casing. This pulley is at present illustrated as having a double grooved periphery, in one groove 15 of which operates a flexible cable 16 for an actuating cylinder and in the other groove of which is connected a transmitting cable 17 for transmission to recording mechanism hereinafter described.

Mounted within the casing is a suitable standard 18 embodying spaced vertical arms 19 and 20 each of which mounts a single point bearing 21. The rear arm 20 has adjacent its upper end a branch arm 22 provided with an upturned terminal mounting, in alignment with the point bearings 21, a double point bearing 23. Between the point of the bearing 21 of arm 19 and the confronting point of bearing 23 I support for rotation the member 24 at present shown as in the form of a wheel having a peripheral groove at 25 and between the other point of point bearing 23 and the point bearing of the rear arm 20 I support a similar wheel 26 the grooved periphery of which is indicated at 27. Each wheel is at present shown as having an axial bore 28 receiving a plug shaft 29 with oilless bearings 29ᵃ of impregnated wood mounted in the ends of which the point bearings engage although these members may be, obviously, otherwise constructed for engagement with the point bearings if so desired. By offsetting the central and hub portions of wheels 24 and 26 sufficient space is formed between these wheels to permit the disposition of the terminal of the branch arm therebetween while at the same time keeping the peripheries of the wheels in close alignment to one another. This avoids any necessity for setting the indicators 11 at different points in the casing and assists in maintaining the casing at a reasonable depth.

Member 26 is provided with a circumferentially elongated opening 30 to admit passage of arm 22 and this member has secured thereto the forwardly projecting arm 31. Member 24 has formed therethrough a circumferentially elongated opening 32 for the passage of the arm 31 of the member 26 and this member 24 inwardly of the opening 32 has secured thereto a flexible pen support 33, this support preferably directly engaging the plug shaft 29 of member 24. A similar pen support 35 is secured to the forward end of arm 31 of member 26. Flexible pen supports 33 and 35 are disposed in planes spaced longitudinally of the axis of the bearings 21, 23 so that they may freely pass one another. The upper end of each arm mounts a pen element 36, the holder for the pen element comprising a pair of spring jaws 37ª and 38 adapted to receive the body of the pen element therebetween and yieldably clamp the same. The inner jaws 37ª each have an upwardly and inwardly inclining extension 37ᵇ, that of the holder of the inner pen support having its terminus substantially vertically directed as at 37ᶜ and formed with a notch 37ᵈ, while that of the holder of the outer pen support has its terminus downwardly directed as indicated at 37ᵉ and formed with a notch 37ᶠ. Notches 37ᵈ and 37ᶠ receive the nibs 36ª of the pens, holding these nibs in proper alignment with the supports and at the same time serving as a gauge for positioning the nibs. The nib of the pen of the outer support is downwardly and inwardly inclined while that of the pen of the inner support is upwardly and inwardly inclined, so that these nibs may very closely approach one another in their engagement with the chart sheet and at the same time pass without interference.

Associated with the pen-operating mechanism just described is the usual record-sheet-rotating mechanism including a sheet holder 38 mounted upon the rotating stem 39 of a clock-work mechanism 40, this mechanism being likewise located within the casing 10. It will be obvious that with cables 17 of the indicators 11 connected to the members 24 and 26 the recording mechanism will provide a permanent record of each of the dial readings.

The arrangement recited not only provides a compact mechanism permitting its use in a relatively shallow casing, but may, likewise, be very cheaply manufactured and readily assembled. Furthermore, the arrangement permits of ready adaptation of a penholder-withdrawing mechanism for use in maintaining the pens in withdrawn position while changing record sheets, or during periods when no record is desired. Such a penholder-withdrawing mechanism I have illustrated in the accompanying drawings in which the numeral 41 designates a lever pivoted to the forward arm 19 of standard 18 as at 42 and having its lower end operating between stops 43 and 44 carried by a side face of the standard. The end of the lever is preferably in frictional engagement with a base 45 of the arm 19 from which the stops 43, 44 project so that the arm tends to remain in any position in which it is disposed. The upper end of this lever has an arcuate arm 46 paralleling the sheet holder 38 which is provided with a spaced reverted terminal 47 paralleling the arm 46 and lying therebehind. When the lever 41 is in contact with stop 43 the pen supports 33, 35 may occupy their normal position and have the pens 36, thereof in engagement with the chart. When, however, the lever terminal is in engagement with stop 44 the arms 46, 47 engage the pen supports 33 and 35 moving them outwardly so that the pens are moved from engagement with the chart. To facilitate movement of the lever 41 the upper end thereof is provided with a pen-shifter-projecting-finger-hook 48.

Since the construction herein employed is obviously capable of considerable modification without in any manner departing from the spirit of my invention, I do not wish to be understood as limiting myself thereto except as hereinafter claimed.

I claim:

1. In a double-recording gauge, bodily rotatable members, axially aligned bearings for said members, a rotatable chart-holder extending adjacent the outer face of one of the members, a penholder associated with and rotating with said member and having a pen for engagement with the chart, said member having an eccentrically disposed opening formed therein, an eccentrically disposed support carried by the other member and projecting through said opening and a penholder carried by said support and adapted to carry a pen for coaction with the chart carried by the chart-holder.

2. In a double-recording gauge, coaxial rotatable members, a rotatable chart-holder extending adjacent the outer face of one of the members, a penholder associated with and rotating with said member and having a pen for engagement with the chart, said member having an opening formed therein, a support carried by the other member and projecting through said opening, a penholder carried by said support and adapted to carry a pen for coaction with the chart carried by the chart-holder, supporting bearings engaging the outer faces of said members, a bearing element affording bearings for the adjacent faces of the members and a support for the last-named bearing element extending through an opening in one of the members.

3. In a double-recording gauge, coaxial rotatable wheels, a rotatable chart-holder extending adjacent the outer face of one of the wheels, a penholder associated with and rotating with said wheel and having a pen for engagement with the chart, said wheel having an opening formed therein, a support carried by the other wheel and projecting through said opening, a penholder carried by said support and adapted to carry a pen for co-action with the chart, the central and hub portions of said wheels being outwardly offset, supporting bearings engaging the outer faces of said wheels, a bearing element affording bearings for adjacent faces of the wheels and a support for the last-named bearing element extending through an opening in one of the wheels and into the space formed by outwardly offsetting the wheels.

4. In a double-indicating-recording gauge, pen supports adapted to operate about the same axis over a common chart, penholders carried by the free ends of the supports, pens disposed in the holders, and nibs for said pens oppositely inclined to enable the chart-contacting terminals thereof to closely approximate without touching one another.

5. In a double-indicating-recording gauge, pen supports adapted to operate over a common chart, penholders carried by the free ends of the supports, pens disposed in the holders, and nibs for said pens oppositely inclined to enable the chart-contacting terminals thereof to closely approximate without touching one another, said holders comprising guiding means for said nibs, maintaining the nibs in predetermined position with relation to the supports and determining the longitudinal position of the nib with relation to the support.

MORO M. BORDEN.